United States Patent
Ywanne et al.

(10) Patent No.: US 11,231,480 B2
(45) Date of Patent: Jan. 25, 2022

(54) SYSTEM AND GLOBAL METHOD FOR GEOLOCATION USING IMPRECISE DISTANCE AND ANCHOR POSITION MEASUREMENTS

(71) Applicant: THALES, Courbevoie (FR)

(72) Inventors: Frédérique Ywanne, Gennevilliers (FR); Alain Lemer, Gennevilliers (FR)

(73) Assignee: THALES, Courbevoie (FR)

( * ) Notice: Subject to any disclaimer, the term of this patent is extended or adjusted under 35 U.S.C. 154(b) by 179 days.

(21) Appl. No.: 16/322,854

(22) PCT Filed: Aug. 1, 2017

(86) PCT No.: PCT/EP2017/069484
§ 371 (c)(1),
(2) Date: Feb. 1, 2019

(87) PCT Pub. No.: WO2018/024751
PCT Pub. Date: Feb. 8, 2018

(65) Prior Publication Data
US 2020/0284870 A1 Sep. 10, 2020

(30) Foreign Application Priority Data

Aug. 2, 2016 (FR) ..................... 16/01189

(51) Int. Cl.
*G01S 5/02* (2010.01)
(52) U.S. Cl.
CPC ................. *G01S 5/0289* (2013.01)

(58) Field of Classification Search
None
See application file for complete search history.

(56) References Cited

U.S. PATENT DOCUMENTS 9,176,217 B2 * 11/2015 Krasner ............... G01S 1/24

FOREIGN PATENT DOCUMENTS

| EP | 1 617 601 A2 | 1/2006 |
| EP | 2 584 849 A1 | 4/2013 |

OTHER PUBLICATIONS

Mensing, et al., "Centralized cooperative positioning and tracking with realistic communications constraints", 2010 7th Workshop on Positioning, Navigation and Communication, pp. 215-223, Mar. 11, 2010.

(Continued)

*Primary Examiner* — Whitney Moore
(74) *Attorney, Agent, or Firm* — BakerHostetler

(57) ABSTRACT

A global geolocation method and its system for estimating the position of nodes in a network by implementing a step wherein there is minimization of a global criterion representative of all of the inter-node ranging measurements and the coordinates of the anchors, absolute position information on the $k^{th}$ coordinate of the node Mi obtained with an uncertainty $\sigma_{Ai}^{k}$. joint estimation is performed of the coordinates of the nodes forming the state vector, by searching for the minimum of the global squared criterion that takes into account all of the available observations, ranging measurements and anchoring measurements, and their respective uncertainties translated by a covariance matrix on the ranging measurements and on the coordinates of the anchors.

13 Claims, 3 Drawing Sheets

(56) References Cited

OTHER PUBLICATIONS

Wendeberg, et al., "Calibration-Free TDOA Self-Localization", Journal of Location Based Services, May 2013.
Wang, et al., "Anchor-Based Three-Dimensional Localization Using Range Measurements", 2012 8th International Conference on Wireless Communications, Networking and Mobile Computing, 2012.

* cited by examiner

SYSTEM AND GLOBAL METHOD FOR GEOLOCATION USING IMPRECISE DISTANCE AND ANCHOR POSITION MEASUREMENTS

CROSS-REFERENCE TO RELATED APPLICATIONS

This application is a National Stage of International patent application PCT/EP2017/069484, filed on Aug. 1, 2017, which claims priority to foreign French patent application No. FR 1601189, filed on Aug. 2, 2016, the disclosures of which are incorporated by reference in their entirety.

FIELD OF THE INVENTION

The invention relates to a global method and a system for the geolocation of one (or more) object(s) using distance measurements, obtained by an inter-node distance measurement function known under the term "ranging", and imprecise anchor position measurements. The method thus makes it possible to determine the position of an object on a map, on a plane, in a given reference frame with the aid of its geographical coordinates, latitude/longitude or other coordinates.

BACKGROUND

Determining the position of an object with known distances to other objects having known positions is a conventional subject in the field of localization. In general, use is made of detection stations whose position is perfectly known, or "anchors". In this case, the uncertainty in the result of the position lies mainly in the precision of the distance measurements, called "ranging" measurements further below.

Another possible approach consists in determining the relative positioning of the nodes of a network of stations, on the sole basis of information of relative distances between all or some of these nodes. Precise knowledge of a limited amount of a priori position information regarding certain nodes then makes it possible to determine the absolute position of all of the nodes of the network. However, several obstacles have to be overcome, notably the following:
  All of the distance measurements between the nodes are not necessarily accessible, due to the range of the ranging modules,
  The distance measurements are necessarily affected by errors, making geometric resolution potentially overdetermined,
  The information necessary for absolute positioning may be distributed over the coordinates of a plurality of nodes,
  Finally, the information necessary for absolute positioning may also be affected by errors, which are potentially larger than those associated with the ranging.

This last point is particularly important in practice, notably in collaborative navigation. Specifically, the absolute positioning information of certain nodes is often obtained by receivers of the satellite positioning system known under the abbreviation commercial GNSS (Global Navigation Satellite System), whose positioning error may, in difficult reception conditions, greatly exceed the inter-node distance measurement (ranging) errors. Ignoring this situation may then lead to positioning errors for free nodes, or even to the rejection of ranging measurements that are valid but incompatible with the distances calculated on the basis of the absolute positions, which are assumed to be error-free.

One of the technical problems posed is to find an effective solution for calculating the positions of nodes, so that a metric of the deviations between the ranging measurements and the inter-node distances of the solution is minimal, and while taking into account the uncertainty associated with the ranging errors and with the absolute positioning errors.

The prior art mainly describes two approaches to deal with this problem.

A first approach consists in reconstructing a relative geometry of the nodes of a network using ranging information and, possibly, inter-node angular information, for example by goniometry within a node. These methods are generally grouped together under the term "anchor-free localization". In this approach, which uses only ranging measurements, all of the positions of the nodes are free, a priori, and the methods seek to adjust them such that the mean squared error between the calculated inter-node distances and the ranging measurements is minimal. A great number of algorithms have been proposed, from the simple mass-spring algorithm to more complex optimization techniques, for example, the least-squares solution by Newton-Raphson, particle filtering, etc. Most of the variants of this approach seek to avoid convergence to a local minimum, without however guaranteeing this.

A second approach aims to reconstruct the absolute position of the nodes of the network using ranging information through knowledge a priori of the position of some of said nodes, these being called "anchors". This also involves minimizing the mean squared deviation between the distance between the positions of the nodes and the ranging measurements, certain positions being a priori fixed and known. The problem is then a problem of minimizing a function of the coordinates of free nodes, for example via a steepest descent algorithm. The article "Anchor-Based Three-Dimensional Localization Using Range Measurements", Wang, Yue et al., illustrates this approach, which does not however guarantee that a global optimum is achieved. Some more theoretical works propose global optimization methods.

A third approach uses external sources or anchors having unknown positions. The problem is known under the term "self-calibration", in which it is sought to jointly locate sources and the sensors that detect them. Time differences of arrival or TDOA are used, this giving less rich information than a direct ranging measurement, similar to a time of arrival or TOA, and not utilizing information a priori on the positions of the sources. The article "Calibration-Free TDOA Self-Localization", Wendeberg Johannes et al., in Journal of Location Based Services, May 2013, illustrates one possible implementation of this approach through a plurality of conventional algorithms (mass-spring, gradient descent, Gauss-Newton, etc.) or more specific algorithms (Cone alignment algorithm), these algorithms being known to those skilled in the art.

One of the drawbacks of the prior art is that it assumes:
  Either that all of the positions of the sensors are free, delivering only a geometry of all of the nodes that is potentially precise, but relative coordinates of the nodes with respect to one another,
  Or that the determination of the absolute position of the nodes is based on external knowledge of the position of some of said nodes whose accuracy is assumed to be perfect.

A priori, the prior art does not deal with joint integration of the uncertainty as to the position of the anchors and of the possible questioning of these positions.

FIG. 1 illustrates the problems that are not solved by the prior art. In this example, the coordinates of the anchors associated with the nodes $M_1$ and $M_2$ are assumed to be accessible ideally, that is to say without error, for example by virtue of topographical surveys, whereas the coordinates of the anchor $M_3$ are in practice affected by an error d3, for example measured by a GNSS system, positioning the anchor $M_3$ at the point $M'_3$. Another assumption of this illustration is that the ranging precision is perfect; in practice the error is much smaller than d3. The ranging measurements are represented by an arrow in FIG. 1. The prior art techniques incorrectly estimate the position of the free node at $M'_4$, the actual position of the free node $M_4$, by distributing the ranging errors associated with this node, which results in a significant residual mean squared error minimum. Furthermore, the position of the node $M_3$ is not questioned, and remains erroneous.

SUMMARY OF THE INVENTION

The method according to the invention presents a method for estimating the positions of the nodes based on global minimization of a criterion, which consists of the weighted squared deviation between all of the distance measurements between nodes of the network and the anchoring measurements available at a given time, and a model of associated theoretical measurements. The method will use a heterogeneous measurement vector comprising both the inter-node ranging measurements (inter-node distance measurements) and the coordinates of the anchors about which imprecise knowledge is available. The coordinates of the anchors are therefore introduced as additional measurements having known covariance, added to the inter-node ranging measurements in the observation vector (also called "measurement vector"). The coordinates of the associated nodes are introduced in parallel into the state vector to be estimated, such that they are able to be questioned by the minimization algorithm. The method then consists in jointly estimating the coordinates of the nodes forming the state vector by searching for the minimum of the global squared criterion that takes into account all of the available observations (ranging measurements and anchoring measurements) and their respective uncertainties (covariance matrix on the ranging measurements and on the coordinates of the anchors).

The invention relates to a method for determining the position of one or more objects Mi capable of moving in a network, one or more objects being provided with an ability to measure distance to the other objects of the network, characterized in that it comprises at least the following steps:
having coordinates of points Ai and the uncertainty as to these coordinates, describing information on the position of all or some of the objects to be located, called anchored objects,
measuring at least one inter-object distance between at least one or more pairs of objects Mi, Mj, with an uncertainty value associated with each measurement, and executing the following steps:
Calculating an initial vector X representative of the estimated positions for the nodes whose position is sought,
Calculating a criterion C(X) by using an observed measurement vector $\hat{Me}s$ containing all of the inter-object distance measurements available for the objects having a position to be estimated and coordinates of objects said to be anchored, a covariance matrix representing the statistical variation on the measurement vector and the theoretical measurement vector Mes(X) corresponding to the observed measurement vector $\hat{Me}s$,
Minimizing this criterion C(X) and determining the coordinates of the position of one object or of said objects corresponding to this minimum, X=Arg Min[C(X)].

According to one variant embodiment, the method uses a criterion C(X) defined as follows:

$$C(X) = [\hat{Me}s - Mes(X)]^T \Sigma^{-1} [\hat{Me}s - Mes(X)]$$

where:
T denotes the transpose,
X is the state vector containing the coordinates of the objects for which it is sought to estimate the position corresponding to all or some of the positions $P(t) = \{M_i(t)\}_{i=0\ldots N-1}$, $$\hat{Me}s = \begin{pmatrix} R \\ A \end{pmatrix}$$

is the observed measurement vector containing all of the observations available at the time t under consideration; it is formed:
Of a vector R containing the ranging measurements $r_{ij}$ available at this time t,
Of a vector A containing the anchoring measurements $A_i^k$ available at this time, corresponding to absolute position information on the $k^{th}$ coordinate of the node $M_i$, obtained with an uncertainty $\sigma_{Ai}^k$ corresponding to the standard deviation on this coordinate;

$$Mes = \begin{pmatrix} D(X) \\ X_A \end{pmatrix}$$

the model vector of the measurements, which contains the theoretical measurements associated with the observed measurements $\hat{Me}s$ it is formed of two vectors D(X) and $X_A$ where:
the components of D(X) correspond to the inter-node distances, between two nodes $d(M_i, M_j)$,
$X_A$ comprises all or some of the components of the state vector X.

$$\Sigma = \begin{pmatrix} \Sigma_R & \Sigma_{AR}^T \\ \Sigma_{AR} & \Sigma_A \end{pmatrix}$$

is the covariance matrix including the covariance matrix $\Sigma_R$ containing the uncertainties as to the ranging measurements and the covariance matrix $\Sigma_A$ containing the uncertainties as to the anchoring measurements, as well as the rectangular matrix $\Sigma_{AR}$ containing the cross-covariances between these two types of measurement.

To define the covariance matrix $\Sigma_A$, uncertainties $\sigma_{Ai}^k$ as to each coordinate of the anchors and their possible correlation are taken into account, for example; to define the covariance matrix $\Sigma_R$, uncertainties as to each ranging measurement and their possible correlation are taken into account; to define the matrix $\Sigma_{AR}$, possible correlations between the errors in the ranging measurements and the errors in the coordinates of the anchored objects are taken into account.

The invention also relates to a device for determining the position of one or more objects $M_i$ able to move in a network, one or more objects being provided with an inter-node distance measurement device, the nodes communicating with one another by virtue of a communication means, characterized in that it comprises at least one processor adapted to execute the steps of the method according to the invention and a device for measuring the position of the nodes.

According to one variant embodiment, the network is a communication network and the nodes comprise a radiofrequency communication module.

BRIEF DESCRIPTION OF THE DRAWINGS

Other features and advantages of the present invention will become more clearly apparent on reading the following description of exemplary embodiments alongside the figures, in which.

DETAILED DESCRIPTION

To better understand the method according to the invention, the following example is given in the case of a communication system 1 comprising a plurality of nodes $M_i$. Each node $M_i$ comprises, for example, a communication means 10, a processor 12 configured to execute the steps of the method according to the invention and a battery 13 or power supply device. The nodes $M_i$ communicate with one another, for example, via a radiofrequency or wireless link or other means known to those skilled in the art.

Figure 2:
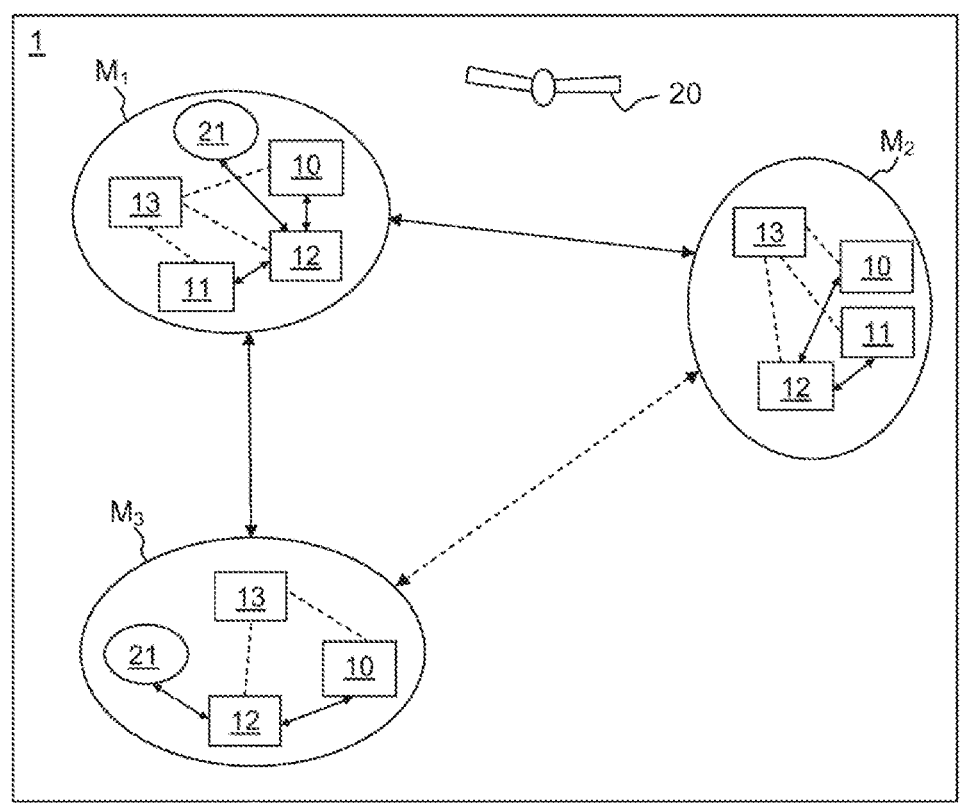
FIG. 2 shows a diagram of a communication network.

The system also comprises a device for determining the absolute position of all or some of the nodes. Thus, all or some of the nodes may for example be equipped with a receiver 11 which, coupled with a satellite device 20, allows the node equipped with the receiver 11 to geolocate itself. This device may be a GPS (Global Positioning System) geolocation system, a GNSS (Global Navigation Satellite System) system, or a topography means. In FIG. 2, the node $M_2$ is equipped with a receiver 11, whereas the node $M_3$ is not.

It also comprises a distance measurement device or ranging device 21 collocated for example on a node $M_i$ or on each of the nodes of the system. For example, the distance measurement device may take the form of an electronic board carried by the node. According to another variant embodiment, this could be a functionality of the communication system on the node measuring the time taken by a radio wave to transit between the nodes.

Given a set of N nodes $M_i$ having positions:

$$\overrightarrow{OM_i} = \begin{vmatrix} x_i \\ y_i \\ z_i \end{vmatrix}$$

in three dimensions (3D) and $$\overrightarrow{OM_i} = \begin{vmatrix} x_i \\ y_i \end{vmatrix}$$

in two dimensions (2D), the coordinates are, for example, chosen in a Cartesian reference frame, O being the origin point chosen in this reference frame.

The distance between two nodes $M_i$, $M_j$, $d(M_i, M_j)$, is defined by $d(M_i, M_j) = \|\overrightarrow{M_i M_j}\|$. All of the positions of the N nodes $M_i$ at a given time t, $P_i(t) = \{M_i(t)\}_{i=0 \ldots N-1}$ is called "current geometry".

$r_{ij}$ is a distance (ranging) measurement obtained between the node $M_i$ and the node $M_j$ by a dedicated measurement device (ranging module situated for example on the node) and known with an uncertainty $\sigma_{r_{ij}}$, corresponding to a standard deviation on the measurement.

The name "anchor" or "anchoring measurement" $A_i^k$ will be given to absolute position information on the $k^{th}$ coordinate of the node $M_i$, obtained with an uncertainty $\sigma_{A_i}^k$, corresponding to the standard deviation on this coordinate. This information may be obtained using various means, such as topographical surveys or GNSS receivers. The information on the position of an anchor varies according to the measurement time. It is a function delivered for example in real time by a GPS device. For simplicity of writing, the time is not indicated. A node having an absolute positioning measurement is called "anchored node".

All of the coordinates of an anchor may be known a priori or only in part, for example when the position of the node is determined by examining a map: if the node is situated on a road, it is possible to know that the node is at a given latitude without knowing the longitude thereof.

The method for estimating the position of nodes, for example, in a communication system implements a step during which it will be sought to minimize a global criterion representative of all of the available inter-node ranging measurements and the coordinates of the anchors, absolute position information on the $k^{th}$ coordinate of the node $M_i$ obtained with an uncertainty $\sigma_{A_i}^k$.

A joint estimation will be performed of the coordinates of the nodes forming the state vector, by searching for the minimum of the global squared criterion that takes into account all of the available observations, ranging measurements and anchoring measurements, and their respective uncertainties translated by a covariance matrix on the ranging measurements and on the coordinates of the anchors.

Before describing one exemplary implementation, the form of the global criterion C(X) to be minimized is given. C(X) is written in the general form:

$$C(X) = [\hat{Me}s - Mes(X)]^T \Sigma^{-1} [\hat{Me}s - Mes(X)]$$

where:
T denotes the transpose
X is the state vector containing the coordinates of the nodes for which it is sought to estimate the position, corresponding to all or some of the positions $P(t) = \{M_i(t)\}_{i=0 \ldots N-1}$. The coordinates of the nodes for which there is an imprecise anchor are introduced into the unknown vector X to be estimated, in order to make the coordinates in the search for the solution modifiable, $$\hat{Me}s = \begin{pmatrix} R \\ A \end{pmatrix}$$

is the observed measurement vector containing all of the observations or measurements available at the time t under consideration; in general, it is formed of two vectors R and A, where:

The vector R contains the ranging measurements available at this time t, The vector A contains the anchoring measurements $A_i^k$ available at this time t; these data are coordinates of certain nodes said to be "anchored", which coordinates are accessible by measurement and obtained for example by one GNSS sensor per object;

$$Mes(X) = \begin{pmatrix} D(X) \\ X_A \end{pmatrix}$$

is the model vector of the measurements, which contains the theoretical measurements associated with the observed measurements $_{\hat{Me}}$s and accessible through calculation; it is therefore formed of two vectors:

D(x) is the theoretical distance vector corresponding to R, calculated using the vector X and, if necessary, a priori knowledge assumed to be perfect; the components of D(X) correspond to the inter-node distances between two nodes, $d(M_i, M_l)$, $X_A$ is the vector containing the theoretical coordinates of the nodes for which anchoring measurements are available; $X_A$ comprises all or some of the components of the state vector X;

Σ is the global covariance matrix on all of the measurements. It therefore comprises:

The covariance matrix $\Sigma_R$ on the ranging measurements, which makes it possible to quantify the uncertainty as to each ranging measurement as well as the possible statistical correlation between the ranging measurements. The precision of the ranging measurement is not necessarily identical for all of the measurements (possible use of different technologies depending on the nodes), and any available information on these precisions is explicitly exploited, The covariance matrix $\Sigma_A$ on the anchoring measurements. The diagonal terms of this matrix are equal to the squares of the uncertainties $\sigma_{Ai}^k$, but it is also possible to take into account correlations between the errors in the various coordinates: the matrix $\Sigma_A$ is not necessarily diagonal, A matrix $\Sigma_{AR}$ comprising the cross-terms resulting from a possible correlation between the errors in the ranging measurements and in the coordinates of the anchors. In the event of no correlation, these cross-terms are zero ($\Sigma_{AR}=0$).

The covariance matrix is therefore written in the following general form:

$$\Sigma = \begin{pmatrix} \Sigma_R & \Sigma_{AR}^T \\ \Sigma_{AR} & \Sigma_A \end{pmatrix},$$

knowing that the terms of $\Sigma_{AR}$ may be zero, and T denotes the transpose.

Figure 3:
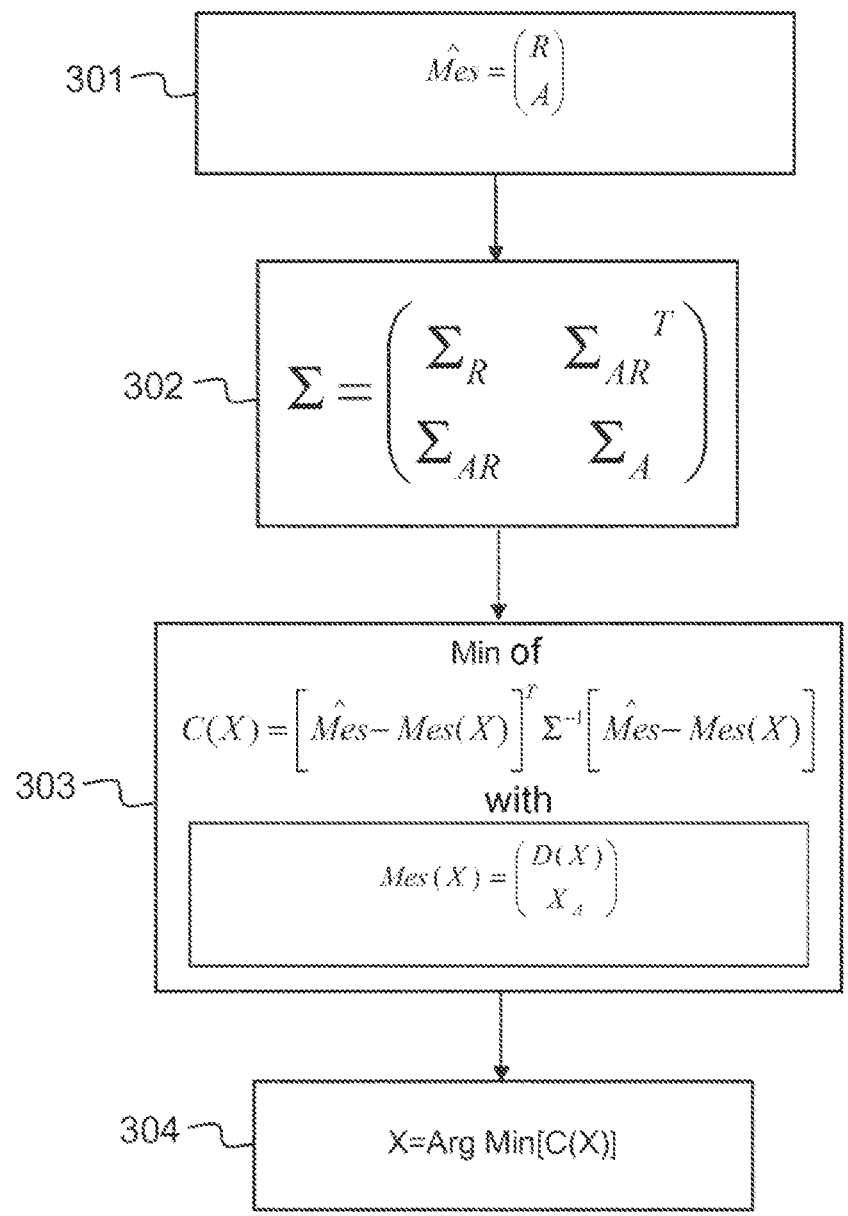
FIG. 3 shows a flow chart with the main steps of the method according to the invention.

One detailed exemplary implementation of the steps of the method according to the invention is given hereinafter and illustrated in FIG. 3. A state vector, a measurement vector and its covariance matrix are developed beforehand.

State Vector X:

the vector X contains the coordinates of the nodes that the method will seek to estimate. In the most general case, the vector X therefore contains the coordinates of the N nodes of the network associated with the positions $P(t) = \{M_i(t)\}_{i=0 \ldots N-1}$.

In 3D, the vector X has 3N components and is written $X = (x_0, y_0, z_0, x_1, y_1, z_1, \ldots, x_{N-1}, y_{N-1}, z_{N-1})^T$.

In 2D, the vector X has 2N components and is written $X = (x_0, y_0, x_1, y_1, \ldots, x_{N-1}, y_{N-1})^T$.

In practice, there may be particular cases where it is not sought to locate certain nodes or to estimate certain coordinates. In this case, the vector X may contain only some of the coordinates of the N nodes. However, if it is desired for the method to be able to modify, in its search for solutions, the positions of the nodes for which inaccurate information is available ("anchors"), the coordinates of these nodes have to be introduced into the state vector X to be estimated.

To implement the method:

The measurement vector Mês, 301, which itself comprises two vectors, is determined:

The vector R containing the ranging measurements $r_{ij}$ available at the time under consideration: it should be noted that the vector R may be oversized considering the maximum number of ranging measures that may be available at a given time, that is to say typically N(N−1) measurements, where N is the maximum number of nodes (and counting the bidirectional measurements i-j and j-i, i and j are the indices of two nodes). Depending on the available measurements, the corresponding indices will or will not be filled, The vector A containing the anchoring measurements $A_i^k$, that is to say the coordinates of the nodes for which there is a priori information having known uncertainty ("anchored nodes");

The covariance matrix on the measurements Σ is constructed, 302, using:

The covariance matrix $\Sigma_R$ on the ranging measurements; the diagonal terms of $\Sigma_R$ are given by the uncertainty values $\sigma_{rij}^2$: if the ranging measurements are decorrelated with respect to one another, the matrix $\Sigma_R$ will be a purely diagonal matrix, The covariance matrix $\Sigma_A$ on the anchoring measurements. The diagonal terms of this matrix are equal to $\sigma_{Ai}^k$, and it is possible to take into account the possible correlation between the errors in the various coordinates: the matrix $\Sigma_A$ is not necessarily diagonal, A matrix $\Sigma_{AR}$ comprising the cross-terms resulting from a possible correlation between the errors in the ranging measurements and the errors in the coordinates of the anchors. In the event of no correlation, these cross-terms are zero ($\Sigma_{AR}=0$).

with:

$$\Sigma = \begin{pmatrix} \Sigma_R & \Sigma_{AR}^T \\ \Sigma_{AR} & \Sigma_A \end{pmatrix}$$

The criterion C(X),
$C(X) = [_{\hat{Me}}s - Mes(X)]^T \Sigma^{-1} [_{\hat{Me}}s - Mes(X)]$, is minimized, 303, by calculating $$Mes(X) = \begin{pmatrix} D(X) \\ X_A \end{pmatrix}$$

the model vector of the measurements, defined above, and

The coordinates of the objects are determined, 304, at the end of the minimization step, by taking the vector X as solution of the minimization of the criterion, X=Arg Min[C(X)], the vector X containing the coordinates of the objects.

Under the assumption of centered additive Gaussian measurement errors having a known covariance matrix $\Sigma$, the estimator minimizing the criterion C(X) is simply the maximum likelihood estimator of X, because minimizing C(X) amounts to maximizing the likelihood probability ($_{M\hat{e}}s|X$). It is additionally deemed to be robust, even in the presence of measurements deviating from this Gaussian error model.

Due to the non-linearity of Mes(X), the minimization of C(X) is not immediate and the effective algorithms minimizing C(X) are iterative algorithms known to those skilled in the art.

There are numerous squared criterion minimization algorithms that may be used to estimate the positions using ranging measurements and anchoring measurements (for example gradient algorithm, Newton-Raphson algorithm, etc.).

One variant embodiment uses the Gauss-Newton algorithms that are deemed to exhibit a good compromise between computational cost, efficiency and robustness. They use a limited development of the second-order criterion, while however neglecting one of the two terms of the Hessian of the criterion. The iteration equation is written in the following general form:

$$X_{k+1} = X_k - \alpha(k) H_k^{-1} J_k$$

where:

$X_k$ is the vector of the coordinates of the nodes estimated at the iteration k, $$J_k = -2 \left[ \left( \frac{\partial Mes}{\partial X} \right)^T \Sigma^{-1} (_{M\hat{e}}s - Mes(X)) \right]_{X=X_k}$$

is the gradient of the criterion C(X), calculated at $X_k$, $$H_k = 2 \left[ \left( \frac{\partial Mes}{\partial X} \right)^T \Sigma^{-1} \left( \frac{\partial Mes}{\partial X} \right) \right]_{X=X_k}$$

is the first term of the Hessian of the criterion C(X), calculated at $X_k$, $$\left( \frac{\partial Mes}{\partial X} \right)$$

is the Jacobian matrix on the theoretical measurement vector Mes(x), comprising the theoretical distance measurement vector D(X) and the vector $X_A$ containing the coordinates of the "anchored" nodes (and comprising all or part of the state vector X), $\alpha(k)$ is an constant or variable optimization step ($\alpha=1$ for the conventional Gauss-Newton algorithm, but numerous variants use adaptive steps aimed at speeding up convergence, or else at avoiding remaining stuck in a local minimum).

Thus, the iteration equation of the method for determining the vector of the coordinates of the nodes at the iteration k+1 from the iteration k is expressed by:

$$X_{k+1} = X_k + \alpha(k) \left[ \left( \frac{\partial Mes}{\partial X} \right)^T \Sigma^{-1} \left( \frac{\partial Mes}{\partial X} \right) \right]^{-1} \left( \frac{\partial Mes}{\partial X} \right)^T \Sigma^{-1} [_{M\hat{e}}s - Mes(X)].$$

The new estimation $X_{k+1}$ results from the application of a "return force" to the deviation vector [$_{M\hat{e}}s - Mes(X)$] between observed measurements and theoretical measurements, whether this involves ranging or anchoring.

In the particular case of a squared criterion:

A matrix (not square and not diagonal in general) is applied to the vector [$_{M\hat{e}}s - Mes(X)$]; in other words, the minimization is performed globally and not node-by-node or measurement-by-measurement. This matrix is not constant or "free" (to within the alpha coefficient), but results from a precise calculation involving the Jacobian matrix of the theoretical measurement vector Mes(X).

In practice, it may be noted that the ranging measurements and the anchoring coordinate measurements originate a priori from independent measurement systems, such that these respective measures are more often than not decorrelated. In this particular case, the covariance matrix is block-wise diagonal and is written $$\Sigma = \begin{pmatrix} \Sigma_R & 0 \\ 0 & \Sigma_A \end{pmatrix};$$

the criterion C(X) then consists of the sum of two criteria: one, denoted $C_R$, on only the ranging measurements and the other, $C_A$, on only the anchoring measurements, with:

$$C(X) = C_R + C_A = [R - D(X)]^T \Sigma_R^{-1} [R - D(X)] + [A - X_A]^T \Sigma_A^{-1} [A - X_A].$$

Figure 4:
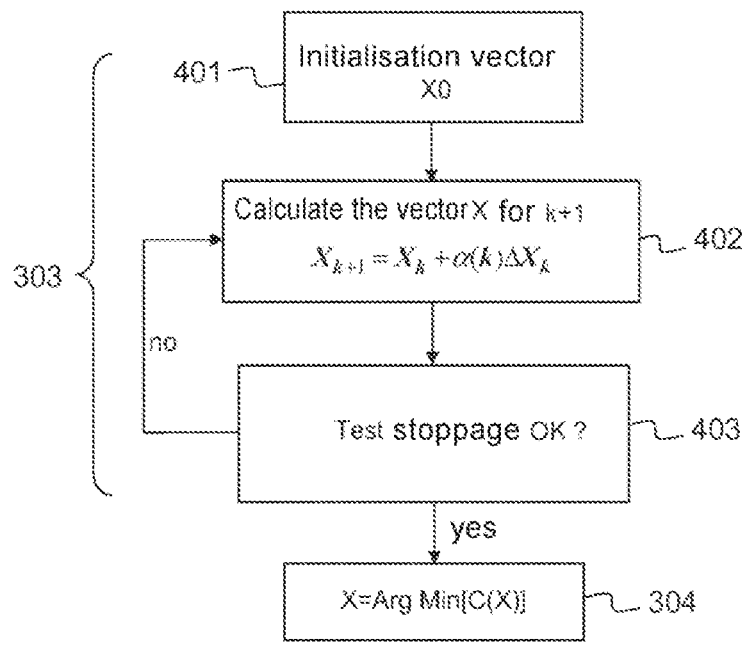
FIG. 4 shows one exemplary implementation of the method according to the invention.

According to one variant embodiment, the estimation of the vector X minimizing the criterion C(X), (303 FIG. 3) in its general form, is obtained iteratively by applying the steps illustrated in FIG. 4:

Initialization step, 401: an initial vector $X_0$ is available at input, containing estimated positions of the nodes, which vector may be obtained in several ways:

a. By using the estimated positions resulting from a previous application of the method, b. By using the result of a suboptimal pre-positioning algorithm, for example the method described in the Applicant's patent application filed on the same day and entitled "method and system of geolocation by direct calculation of movement elements", or else a suboptimal direct algorithm on the pseudo-linearization PSL ranging measurements, c. Deterministically, for example by utilizing known elements on the coordinates of certain nodes. Typically, if anchoring data are available for a given node, the coordinates of the vector X are initialized by the anchoring data, d. Randomly (random draw); for the nodes for which there are no anchoring measurements available, there may be a random draw from an area or according to a predefined geometry; for the nodes for which anchoring data are available, it is possible to use a random draw centered on the anchor and having covariance equal to the covariance on the anchor. This technique makes it possible to initialize the method other than on a zero of the criterion $C_A$ linked to the anchors, and thus to avoid remaining stuck on local minima.

It is also possible to combine these approaches: for example, use the anchoring coordinates to initialize the nodes for which these coordinates are available, and use a PSL algorithm utilizing the ranging measurements (conventional localization on TOA measurements) for the other nodes.

Step 402—the vector X containing the coordinates of the points for an iteration k+1 will be calculated using the vector obtained at the previous iteration k and using a weighted return vector calculated so as to reduce the criterion:

Calculating $X_{k+1}$ from $X_k$: $X_{k+1} = X_k + \alpha(k)\Delta X_k$

Calculating the Jacobian matrix $$\left(\frac{\partial Mes}{\partial X}\right) = \begin{pmatrix} \frac{\partial D}{\partial X} \\ \frac{\partial X_A}{\partial X} \end{pmatrix}$$

at $X_k$:

the submatrix $$\left(\frac{\partial D}{\partial X}\right)$$

is obtained by differentiating the available theoretical distance measurements: the term l,m of $$\left(\frac{\partial D}{\partial X}\right)$$

is thus obtained by differentiating the $li^{th}$ inter-object distance measurement with respect to the $m^{th}$ component of the state vector to be estimated, The submatrix $$\left(\frac{\partial X_A}{\partial X}\right)$$

in relation to the anchoring measurements contains only 0s and 1s.

Calculating the "return" vector $\Delta X_k$ to be applied by minimizing:

$$\left[\left(\frac{\partial Mes}{\partial X}\right)\Delta X_k - \Delta Mes_k\right]^T \Sigma^{-1}\left[\left(\frac{\partial Mes}{\partial X}\right)\Delta X_k - \Delta Mes_k\right] \text{ with}$$

$$\Delta M_k = \hat{M_e} s - Mes(Xk).$$

This is a weighted linear least squares problem whose explicit solution was given above:

$$\Delta X_k = \left[\left(\frac{\partial Mes}{\partial X}\right)^T \Sigma^{-1}\left(\frac{\partial Mes}{\partial X}\right)\right]^{-1}\left(\frac{\partial Mes}{\partial X}\right)^T \Sigma^{-1}\Delta Mes_k.$$

According to one variant embodiment, the problem is solved using singular value decomposition (SVD), whose details are well known to those skilled in the art. The SVD decomposition solution exhibits the advantage of being more numerically stable and of dealing with the case of a singular matrix $$\left[\left(\frac{\partial Mes}{\partial X}\right)^T \Sigma^{-1}\left(\frac{\partial Mes}{\partial x}\right)\right],$$

which may be the case when there are not enough available ranging measurements or anchoring data. In this case, the algorithm will adapt itself by automatically setting certain variables of the state vector.

Calculating the step $\alpha(k)$: this step may be:
Set once and for all, which is the least expensive solution ($\alpha=1$ in the original Gauss-Newton algorithm),
Adjusted at each iteration, so as to converge as quickly as possible: several published methods for determining the step are possible, such as for example the Brent method, the Levenberg-Marquardt method, etc. Some semi-empirical methods consisting in starting from a set value and then in dividing by a coefficient P until the criterion decreases (or reaches a minimum value) generally constitute a good compromise between computational cost and speed of convergence.

Updating the estimated vector: $X_{k+1} = X_k + \alpha(k)\Delta X_k$;

Step 403—Stopping the iterative method, which continues until predefined conditions are satisfied, typically:
Criterion C(X) not decreasing from one iteration to the next, i.e. $C(X_{k+1}) \geq C(X_k)$,
Relative decrease of the criterion C(X) below a predefined threshold, i.e., $(C(X_{k+1}) - C(X_k)) \geq \text{threshold} * C(X_k)$,
Maximum number of iterations reached,
Estimated positions no longer changing sufficiently from one iteration to the next ($|\Delta X| < \text{threshold}$), etc.

The vector X corresponding to the found minimum of the criterion C(X) when the iterations are stopped is considered to be the final solution, containing the estimated coordinates of the nodes that it was sought to geolocate.

The method may comprise an additional step that checks the validity of this final solution using the residuals vector, for example by comparing the residual squared criterion C(X) with a threshold (classic "residuals" test involving a chi2 test), or else by looking at whether the maximum component of the residuals vector is greater than a threshold ($L^1$ norm of the residuals vector known to those skilled in the art).

Without departing from the scope of the invention, the steps described above apply in communication networks where a node plays a master role, and also in decentralized communication networks where each of the nodes executes the steps of the method.

Figure 1:
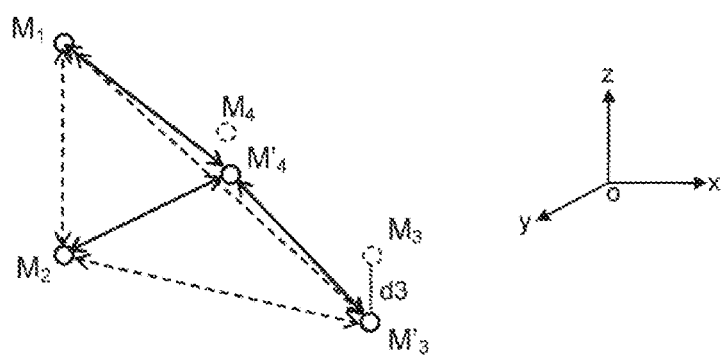
FIG. 1 shows an illustration of the problems of the prior art.
Figure 5:
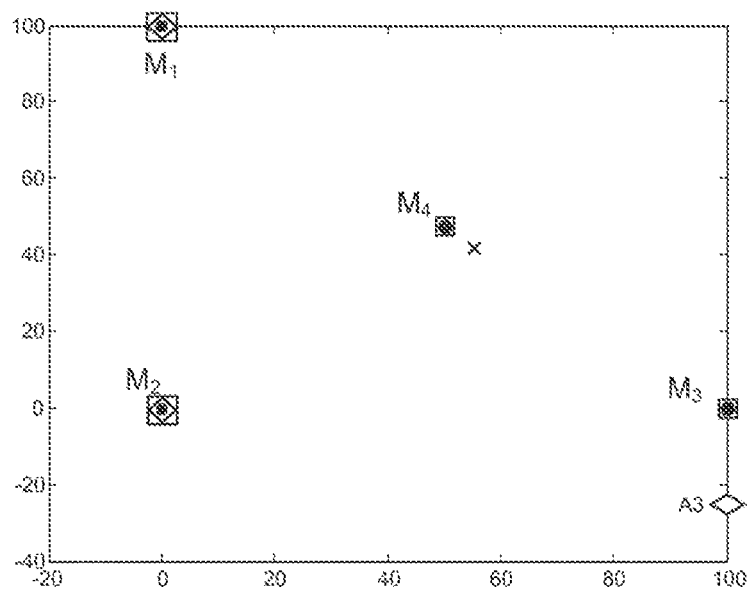
FIG. 5 shows an exemplary result after the method according to the invention has been implemented.

FIG. 5 shows the result of the method applied to the toy problem (FIG. 1) with four nodes $M_1$, $M_2$, $M_3$ and $M_4$, for which only $M_1$, $M_2$, $M_3$ have a priori positioning information ("anchors"); in this figure, the four nodes are shown in a Cartesian reference frame graduated in meters. Points $M_1$ and $M_2$ are anchored with high precision (for example via a topographic survey to within 10 cm), point $M_3$ is anchored but its anchoring position is incorrectly measured with a 20 m error (for example, by virtue of a GNSS means having an uncertainty of 15 m in standard deviation), and point $M_4$ is not anchored (no local absolute position measurement means). All of the nodes are equipped in this case with a local ranging device for measuring the distance to the other nodes, with an uncertainty of 50 cm in standard deviation. These values are only illustrative of the method. In this FIG. 5:

The filled circles are the actual positions of the nodes $M_1$, $M_2$, $M_3$, $M_4$, The hollow rhombi are the positions of the anchors:
those of the nodes $M_1$, $M_2$ are virtually coincident with the true positions (very little positioning error, obtained for example by a topographical survey), that of the anchor $A_3$ corresponding to the position of the node $M_3$ is shifted downward compared with the actual position of the node (high uncertainty as to the anchoring measurement), The hollow squares are the positions estimated by the method, at the end of the iterative process, The cross is the position of the node $M_4$ obtained using a conventional algorithm for locating $M_4$ using ranging measurements on the nodes $M_1$, $M_2$, $M_3$ (location by TOA, with an iterative Gauss-Newton algorithm) without taking into account the uncertainties as to the positions of these "anchors", which are assumed to be perfectly known. The position estimated for the node $M_4$ with this conventional algorithm is logically biased due to the positioning error of the node $M_3$.

It is possible to see that the estimated position of the node $M_4$ at the end of the method is indeed situated at the true position, as are the estimated positions the other three nodes, including the node $M_3$, for which the supplied anchoring datum is however highly erroneous. The method according to the invention, by introducing and utilizing the concept of uncertainty as to the coordinates of the anchors, makes it possible to modify the position thereof so as to arrive, in this ideal theoretical case, at a very small squared error in the ranging measurements. In this simulation, the method has converged at five iterations, starting from an initialization performed as follows:

For the nodes $M_1$, $M_2$, $M_3$, initialization on their anchoring positions (correct for $M_1$ and $M_2$, erroneous for $M_3$).

For the node $M_4$ for which there is no a priori information available, automatic initialization using a pseudo-linear direct suboptimal algorithm using ranging measurements on the anchoring positions of the three other nodes.

The method described above makes it possible to calculate a solution for a given set of ranging measurements R, and given anchor coordinates grouped together in a vector A. It may be applied again upon receipt of a new batch of new ranging measurements or new anchor coordinates, even if the new available measurements do not correspond to the same nodes as the ones used at the previous time. Specifically, by virtue notably of the use of SVD, the algorithm automatically adapts to the nature of the measures actually available at a given time.

If the positions of some nodes are perfectly known (precise topographical surveys for example) or it is not desired to question them by estimating them, it is nevertheless possible to introduce them into the state vector and into the measurement vector, as described above, by taking the precaution of using a very low covariance value on the coordinates of these anchors in the matrix $\Sigma_A$. In practice, this will lead mechanically to the algorithm not questioning these coordinates, since a slight deviation will be enough to drastically increase the subcriterion linked to the anchoring measurements ($C_A$ in the uncorrelated case). A less expensive method, since it involves vectors and matrices whose size is smaller than that used with the general method, consists simply in not introducing these perfectly known node coordinates into the state vector X to be estimated and into the measurement vector A. These data then form part of the set parameters of the algorithm involved in the function D(X) (theoretical distance vector), as in a conventional method using anchors having positions assumed to be perfectly known.

In the absence of any a priori, even imprecise, datum on the absolute positions of any one of the nodes of the network, the measurement vector is then reduced to just the ranging measurements and the (absolute) georeferenced coordinates of the nodes are not observable; only the relative positions of the nodes with respect to one another are able to be estimated. The method described above nevertheless remains applicable, the use of SVD in the calculation of the movement making it possible to provide a solution for which some components will remain set at the initialization value. However, in such a case, a less costly alternative, allowing the nodes serving as a landmark to be better controlled, consists in reducing the state vector to just the observable components. For example, in 2D, the deterministic observability of the problem is such that the positioning solution based on ranging measurements alone is indeterminate:

To within an origin $(x_o, y_o)$ (translation),
To within a rotation about $x_o, y_o$ (rotational symmetry),
To within an axial symmetry.

Thus, in order for the estimation problem based on ranging measurements alone to be able to be observable, it is possible for example to choose two nodes (0 and 1) as references of the local reference system and consider a state vector X containing 2N−3 components:

The 2(N−2)=2N−4 coordinates of the (N−2) other nodes (all except the nodes 1 and 2) whose positions (x,y) in the local reference frame will be estimated, The abscissa $x_1$ (or the ordinate $y_1$) of the node 1.

Thus, the vector X to be estimated will match the positions of the nodes 1 to N−1 in a reference frame with the node 0 as origin and of the abscissa axis (respectively the ordinate axis), the axis passing through the nodes 0 and 1; it will be written in the form $X=(x_1, x_2, y_2, x_3, y_3, \ldots x_{N-1}, y_{N-1})^T$.

With this choice of vector X, the problem becomes observable in 2D (if ad-hoc ranging measurements are available), even if it remains ambiguous on account of the symmetry, which means that the solution found by the method will have a dual solution that is symmetric about the fixed reference axis.

The method according to the invention is based on a rigorous formalization of the optimization of the movements towards the solution that minimizes the global weighted squared error, and the proposed solution is optimal in terms of the maximum likelihood under relatively non-constrictive assumptions (centered Gaussian errors having known covariances). In addition, the method takes full advantage of the information available on the accuracy of the ranging measurements, and therefore makes it possible to use highly heterogeneous ranging measurements within one and the same network. Likewise, using covariance matrices on the coordinates of the anchors, the method is able to take into account highly disparate uncertainties as well as correlations between the coordinates of the anchors, in the practical case of coordinates coming from GNSS receivers that are highly different or situated in highly different reception conditions.

The invention claimed is:

1. A method for determining a position of one or more objects Mi capable of moving in a network, the one or more objects being provided with an ability to measure distance to other objects of the network, each object comprising a communication means, wherein the method comprises at least the following steps:
   having coordinates of points Ai measured by at least a device for determining an absolute position of said coordinates of points and an uncertainty as to these coordinates, describing information on a position of all or some of the objects to be located, called anchored objects,
   measuring by a distance measurement device or ranging device at least one inter-object distance between at least one or more pairs of objects Mi, Mj, with an uncertainty value associated with each measurement, and executing by a processor the following steps:
   calculating an initial vector X representative of the estimated positions for nodes whose position is sought,
   calculating a criterion C(x) by using an observed measurement vector $\hat{Mes}$ containing all inter-object distance measurements available for the objects having a position to be estimated and measured coordinates of objects said to be anchored, a covariance matrix representing statistical variation on the measurement vector and a theoretical measurement vector Mes(X) corresponding to the observed measurement vector $\hat{Mes}$, and
   minimizing this criterion C(x) and determining the coordinates of the position of one object or of said objects corresponding to this minimum, X=Arg Min[C(X)].

2. The method as claimed in claim 1, wherein the criterion C(X) is defined as follows:

$$C(X)=[M\hat{e}s-Mes(X)]^T \Sigma^{-1} [M\hat{e}s-Mes(X)]$$

where:
   T denotes a transpose,
   X is a state vector containing the coordinates of the objects for which it is sought to estimate the position corresponding to all or some positions $P(t)=\{M_i(t)\}_{i=0...N-1}$, $$\hat{Mes} = \begin{pmatrix} R \\ A \end{pmatrix}$$

is the observed measurement vector containing all of the observations available at the time t under consideration; it is formed:
   of a vector R containing the ranging measurements $r_{ij}$ available at this time t,
   of a vector A containing the anchoring measurements $A_i^k$ available at this time, corresponding to absolute position information on the $k^{th}$ coordinate of the node $M_i$, obtained with an uncertainty $\sigma_{Ai}^k$, corresponding to the standard deviation on this coordinate;

$$Mes(X) = \begin{pmatrix} D(X) \\ X_A \end{pmatrix}$$

the model vector of the measurements, which contains the theoretical measurements associated with the observed measurements Mês; it is formed of two vectors D(X) and $X_A$ where:
   the components of D(X) correspond to the inter-node distances, between two nodes $d(M_i, M_j)$,
   $X_A$ comprises all or some of the components of the state vector X, $$\Sigma = \begin{pmatrix} \sum_R & \sum_{AR}^T \\ \sum_{AR} & \sum_A \end{pmatrix}$$

is the covariance matrix including the covariance matrix $\Sigma_R$ containing the uncertainties as to the ranging measurements and the covariance matrix $\Sigma_A$ containing the uncertainties as to the anchoring measurements, as well as the rectangular matrix $\Sigma_{AR}$ containing the cross-covariances between these two types of measurement.

3. The method as claimed in claim 2, wherein to define the covariance matrix $\Sigma_A$, uncertainties $\sigma_{Ai}^k$ as to each coordinate of the anchors and their possible correlation are taken into account, to define the covariance matrix $\Sigma_R$, uncertainties as to each ranging measurement and their possible correlation are taken into account, and to define the matrix $\Sigma_{AR}$, possible correlations between the errors in the ranging measurements and the errors in the coordinates of the anchored objects are taken into account.

4. The method as claimed in claim 1, wherein a state vector X is initialized using at least one of the following methods:
   arbitrarily, deterministically,
   randomly, by randomly drawing the values of the coordinates of the nodes,
   by using the estimated positions resulting from a previous application of the method,
   by using a suboptimal resolution method solution, such as pseudo-linearization PSL, or another inexpensive algorithm,
   by utilizing known elements on coordinates of certain nodes, such as the anchoring coordinates for the "anchored" objects.

5. The method as claimed in claim 1, wherein position information on the anchors is obtained using topographical surveys or by a GNSS system in real time.

6. The method as claimed in claim 1, wherein the criterion C(X) is minimized by implementing a Gauss-Newton algorithm.

7. The method as claimed in claim 1, wherein the vector X(k+1) for an iteration k+1 is obtained from the vector X(k) obtained at a previous iteration k by executing a linear least squares method using a singular value decomposition.

8. The method as claimed in claim 1, further comprising utilizing a condition for stopping the method that uses one of the following criteria:
   criterion C(X) not decreasing from one iteration to the next,
   relative decrease of the criterion C(X) below a predefined threshold,
   maximum number of iterations reached,
   estimated positions no longer changing sufficiently from one instant to a next ($|\Delta X|$<threshold).

9. The method as claimed in claim 1, wherein an object is designated as master and in that said object is configured to execute the steps of the method as claimed in claim 1 and to centralize the results.

10. The method as claimed in claim 1, wherein each object of the network is configured to execute the steps of the method as claimed claim 1.

11. The method as claimed in claim 1, wherein the object whose position is sought is a node in a communication system.

12. A device for determining a position of one or more objects Mi able to move in a network, the one or more objects being provided with an inter-node distance measurement device, nodes communicating with one another by virtue of a communication means, wherein the device comprises at least one processor configured to execute the steps of the method as claimed in claim 1, and a device for measuring the position of the nodes.

13. The device as claimed in claim 12, wherein the nodes comprise a radiofrequency communication module and the network is a communication system.

* * * * *

UNITED STATES PATENT AND TRADEMARK OFFICE
CERTIFICATE OF CORRECTION

| | |
|---|---|
| PATENT NO. | : 11,231,480 B2 |
| APPLICATION NO. | : 16/322854 |
| DATED | : January 25, 2022 |
| INVENTOR(S) | : Ywanne et al. |

It is certified that error appears in the above-identified patent and that said Letters Patent is hereby corrected as shown below:

In the Claims

In Claim 1, Column 15, Line 21, delete "calculating an initial vector X representative of the estimated positions" and insert -- calculating an initial vector X representative of estimated positions --.

Signed and Sealed this
Nineteenth Day of April, 2022

Katherine Kelly Vidal
*Director of the United States Patent and Trademark Office*